(12) United States Patent
Rosenberg et al.

(10) Patent No.: US 11,879,798 B2
(45) Date of Patent: Jan. 23, 2024

(54) PERFORATED SUPPORT LAYER THAT FACILITATES STATIC AND DYNAMIC BENDING

(71) Applicant: Sensel, Inc., Mountain View, CA (US)

(72) Inventors: Ilya Rosenberg, Mountain View, CA (US); James Junus, Redwood City, CA (US)

(73) Assignee: Sensel, Inc., Mountain View, CA (US)

( * ) Notice: Subject to any disclaimer, the term of this patent is extended or adjusted under 35 U.S.C. 154(b) by 575 days.

(21) Appl. No.: 16/838,129

(22) Filed: Apr. 2, 2020

(65) Prior Publication Data

US 2020/0319043 A1 Oct. 8, 2020

Related U.S. Application Data

(60) Provisional application No. 62/828,377, filed on Apr. 2, 2019.

(51) Int. Cl.
*B32B 3/24* (2006.01)
*G01L 5/00* (2006.01)
*H05K 5/00* (2006.01)
*B32B 7/12* (2006.01)
*B32B 3/26* (2006.01)

(52) U.S. Cl.
CPC ............ *G01L 5/0028* (2013.01); *B32B 3/266* (2013.01); *B32B 7/12* (2013.01); *H05K 5/0017* (2013.01); *B32B 2457/00* (2013.01)

(58) Field of Classification Search
CPC .............................. G09F 9/301; G01L 5/0028
See application file for complete search history.

(56) References Cited

U.S. PATENT DOCUMENTS

| 2016/0081180 | A1 | 3/2016 | Huitema et al. |
| 2016/0105950 | A1 | 4/2016 | Drzaic et al. |
| 2016/0357052 | A1* | 12/2016 | Kim ................ G06F 1/1652 |
| 2017/0092884 | A1 | 3/2017 | Zhang et al. |
| 2017/0294495 | A1 | 10/2017 | Shyu et al. |

(Continued)

FOREIGN PATENT DOCUMENTS

| CN | 109032251 | 12/2018 |
| KR | 10-2016-014491 A | 12/2016 |

OTHER PUBLICATIONS

International Preliminary Report on Patentability received for PCT Application Serial No. PCT/US2020/026330 dated Sep. 28, 2021, 5 pages.

(Continued)

*Primary Examiner* — William P Watkins, III
(74) *Attorney, Agent, or Firm* — Amin, Turocy & Watson, LLP

(57) ABSTRACT

A perforated support layer that facilitates static and dynamic bending is provided herein. A device can comprise a device chassis, a flexible display panel, and a support layer sandwiched between the device chassis and the flexible display panel. The support layer can comprise a set of perforations formed in a bend region of the support layer. Also provided is a method that can comprise forming relief cuts in a bend region of a support layer. The method also can comprise bonding a first side of the support layer to a device chassis and bonding a second side of the support layer to a flexible display panel.

18 Claims, 10 Drawing Sheets

(56) References Cited

U.S. PATENT DOCUMENTS

2018/0097197 A1     4/2018   Han et al.
2019/0036068 A1     1/2019   Kim et al.

OTHER PUBLICATIONS

International Search Report and Written Opinion for International Application Serial No. PCT/US20/26330 dated Jun. 19, 2020, 7 pages.
Notice of Grounds for Rejection received for Korean Application Serial No. 10-2021-7034616 dated Oct. 26, 2022, 12 pages. (including English Translation).
Extended European Search Report received for European Patent Application Serial No. 20783584.4 dated Dec. 1, 2022, 7 pages.
Communication Pursuant to Rules 70(2) and 70a(2) EPC received for EP Patent Application Serial No. 20783584.4 dated Dec. 20, 2022, 1 page.
Notice of Grounds for Rejection received for Korean Application Serial No. 10-2021-7034616 dated Apr. 19, 2023, 12 pages (Including English Translation).

\* cited by examiner

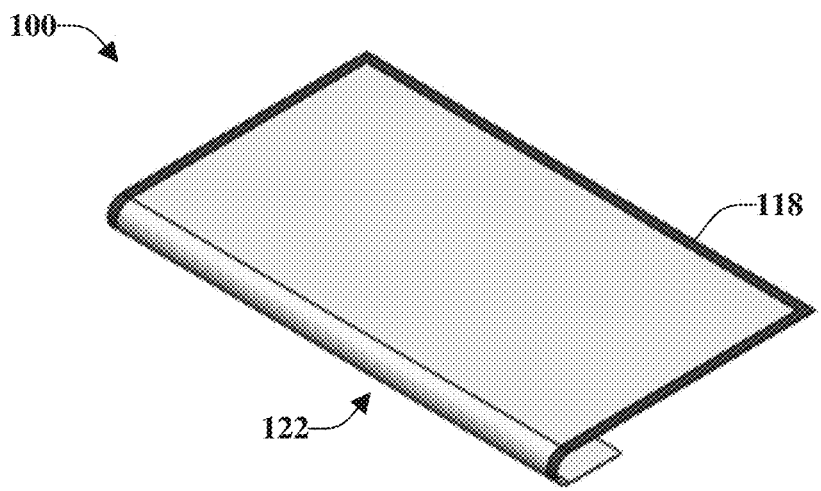
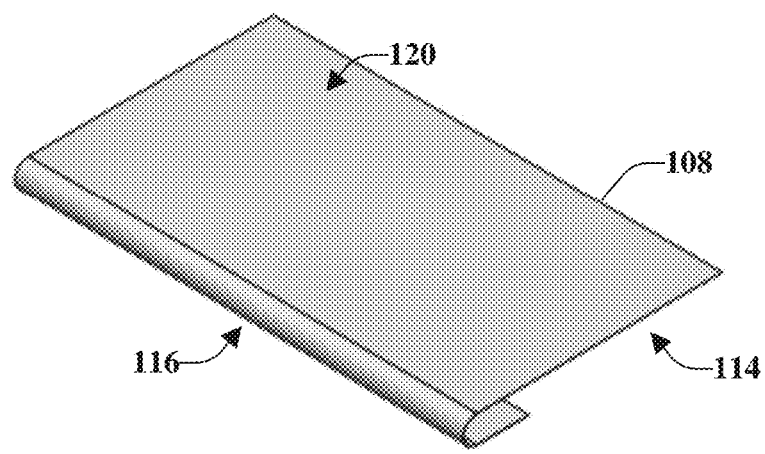
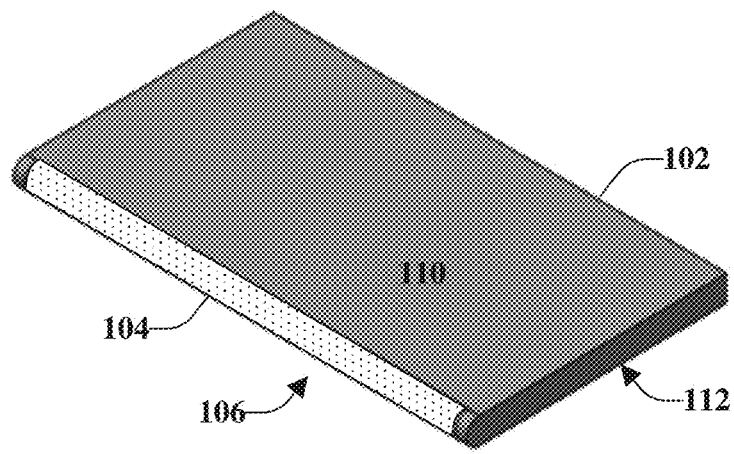
FIG. 1

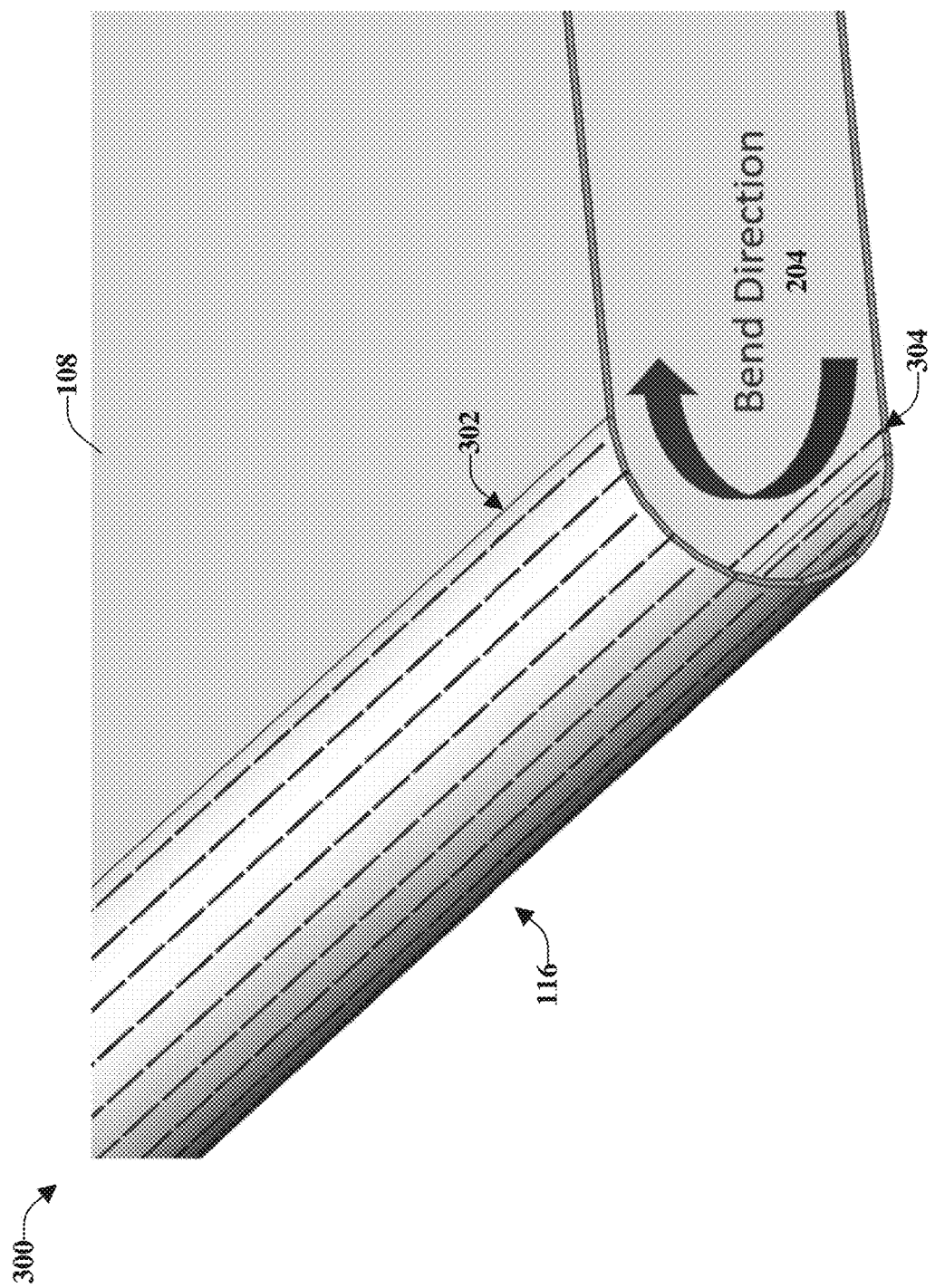

PERFORATED SUPPORT LAYER THAT FACILITATES STATIC AND DYNAMIC BENDING

CROSS-REFERENCE TO RELATED APPLICATIONS

This application claims the benefit of priority to U.S. Provisional Application No. 62/828,377, filed Apr. 2, 2019, and entitled "PERFORATED SENSOR SUPPORT TO FACILITATE BENDING AND SHAPING AROUND CURVED SURFACES," the entirety of which is expressly incorporated herein by reference.

BACKGROUND

Flexible display panels and flexible sensors are often laminated to thin support layers creating a stack to provide support and to hide small defects on a chassis surface. Bending the stack creates several manufacturing obstacles due to the rigidity of the thin support layers. Unique challenges exist to provide support layers for flexible display panels, flexible sensors, and other flexible devices to increase a useful service life of such panels, sensors, and/or devices.

BRIEF DESCRIPTION OF THE DRAWINGS

Various non-limiting embodiments are further described with reference to the accompanying drawings in which:

FIG. 1 illustrates an example, non-limiting, representation of various layers of a device that comprises a perforated support layer in accordance with one or more embodiments described herein;

FIG. 3 illustrates a portion of the bend region that indicates a bend direction in accordance with one or more embodiments described herein;

DETAILED DESCRIPTION

Figure 2A:
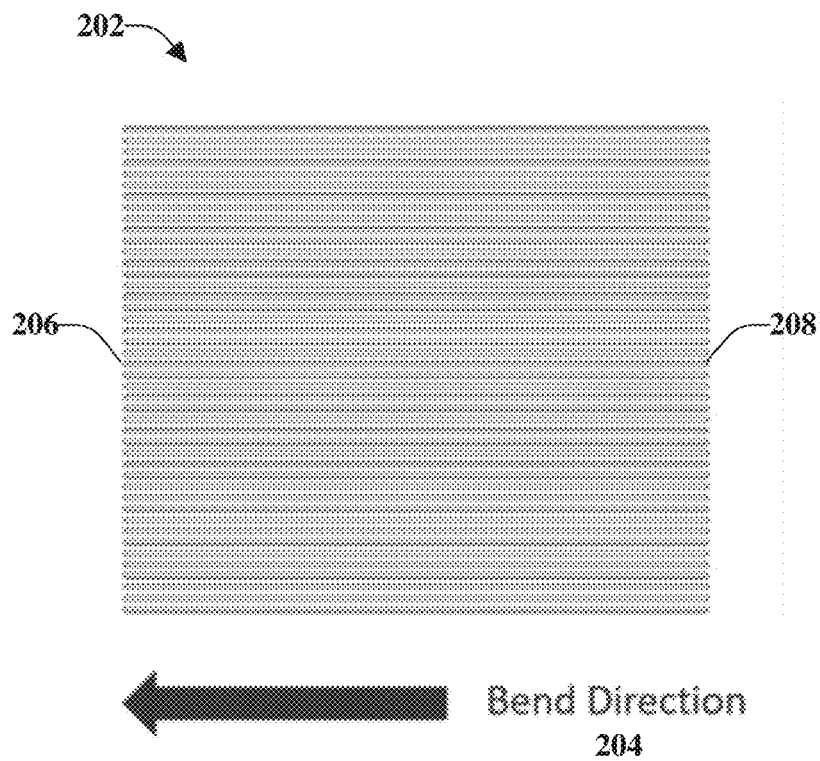
FIGS. 2A through 2E illustrate example, non-limiting, perforation configurations that can be utilized with the disclosed aspects in accordance with one or more embodiments described herein.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details.

Described herein are support layers and methods of fabricating the same to facilitate static and dynamic bending. More specifically, the support layers can be fabricated to facilitate bending and shaping around curved surfaces or other surfaces. As discussed herein, thin support layers can be modified in order to address the challenges faced when attempting to bend the thin support layers. For example, in applications where flexible display panels and/or flexible sensors experience bending, whether in a static bending application or a dynamic bending application, it is common to provide structural support by laminating the flexible display panel and/or flexible sensor to a thin support layer. The disclosed aspects provide methods to reduce the stiffness of the thin support layer thereby improving the bendability of the overall stack up. In dynamic bending applications, such as foldable devices, the disclosed aspects can extend the life of the product by increasing the number of times the device can be folded and/or unfolded before experiencing failure. In static bending applications, such as force sensors being used to replace the power/volume keys on mobile devices, the disclosed aspects can improve sensor performance and/or can add new sensor capabilities. An example of a new sensor capability can be running a finger or other item along an edge of the device to control volume and/or other settings. Another example of a new sensor capability can be squeezing both edges of the device to silence an incoming alert/notification.

Flexible display panels, flexible sensors, and so on, are often laminated to thin support layers to provide support and/or to hide small defects on the chassis surface. Bending this stack up, whether it be a static bend or a dynamic bend, can create several manufacturing obstacles.

For example, an obstacle is overcoming the stiffness of the stack up to achieve the desired curvature. As the support layer thickness increases, it becomes more difficult to bend the stack up. On the other hand, if the support layer is too thin, its ability to support the flexible display panel and to hide small defects on the chassis surface diminishes.

In the case of static bending (e.g., bending to form and remaining in that position), illustrated in FIG. 1 and FIG. 4 below, an obstacle that should be overcome can be where a force sensor is implemented between the thin support layer and the device chassis (as in FIG. 1). In this scenario, any force applied to the curved edge must transfer through the display panel and the thin support layer before reaching the force sensor. If the support layer is too rigid it can prevent these forces from reaching the force sensor.

For dynamic bending applications, such as a foldable device, which will be discussed with respect to FIG. 5 and FIG. 6 below, the stiffness of the bend region can be a critical design. This is because the number of folds a device can experience before a mechanical failure occurs dictates the life of the product. There is a need to have a thin support layer that is thick enough to provide support but flexible enough to allow repeated bends, which is provided with the disclosed aspects.

FIG. 1 illustrates an example, non-limiting, representation of various layers of a device 100 that comprises a perforated support layer in accordance with one or more embodiments described herein. The device comprises a device chassis 102 to which a force sensor 104 is operatively attached or bonded. For example, as illustrated, the force sensor 104 can be located at a curved portion 106 of the device 100.

A support layer 108 can be operatively attached or operatively bonded to the device chassis 102 and the force sensor 104. For example, the support layer 108 can be placed over at least a portion of the device chassis 102 and the force sensor 104. For example, the support layer 108 can be placed over a front side 110 of the device 100 and can extend over the curved portion 106 and over a portion of a back side 112 of the device chassis 102.

The support layer 108 can be a thin support layer, which can comprise steel, metal, aluminum, polymers, plastics, and/or other materials. The support layer 108 can have thicknesses as low as around 0.001 mm. Further, the support layer 108 can comprise a layer of adhesive film on a first side 114 (e.g., a bottom portion as depicted in FIG. 1) of the support layer 108. The first side 114, with the adhesive film, can be laminated to the device chassis 102. According to some implementations, the support layer 108 can be a flat layer that can be formed (e.g. a curved section or bend region 116 can be created on the support layer 108) to the device chassis 102 and the force sensor 104 at about the same time as bonding occurs. In some implementations, the support layer 108 can be partially formed prior to being operatively bonded to the device chassis 102 (e.g., the bend region 116 can be pre-formed). In such a manner, the support layer 108 bends around the curved portion 106.

The bend region 116 of the support layer 108 is perforated. Such perforations (also referred to as relief cuts) can increase the sensitivity of a force applied to the curved portion 106 of the flexible display panel 118, which can facilitate a transfer of the force to the force sensor 104. By adding perforations or relief cuts to the support layer, stiffness in a bend region can be reduced allowing the support layer to be bent in a flexible manner while still providing support to the display. Further, with flexibility and reduced stiffness in the bend region, bending to a specified radius can be achieved in order to conform to one or more device manufacturing specifications. In an example, the radius can be around 5 millimeters (mms), however, the disclosed aspects are not limited to this size radius and other radiuses can be utilized.

FIGS. 2A through 2E illustrate example, non-limiting, perforation configurations that can be utilized with the disclosed aspects in accordance with one or more embodiments described herein. Repetitive description of like elements employed in other embodiments described herein is omitted for sake of brevity.

The examples of FIGS. 2A through 2E are meant to depict perforations implemented on the bend region 116 of the support layer 108. These perforations can help to improve the flexibility of the support layer 108 making it easier to bend and form around curved surfaces (e.g., the bend region 116 or another curved surface). In addition, these perforations can reduce the stiffness of the support layer 108 in the bend region 116. Further, when the perforations are applied to the stack-up illustrated in FIG. 1, force can more easily transmit through the support layer 108 to the force sensor 104.

FIG. 2A illustrates a first group of perforations 202 that can comprise multiple horizontal (as depicted in FIG. 2A) perforations that are parallel to one another. The horizontal perforations of the first group of perforations 202 can extend beyond the length of the bend region 116 (e.g., a height or length of the device 100 along the bend region 116). According to some implementations, the first group of perforations 202 can extend substantially beyond the length of the bend region 116. In another implementation, the first group of perforations 202 can extend less than the length of the bend region 116. In some implementations, some lines of perforations of the first group of perforations 202 can extend beyond the length of the bend region 116 while other lines of perforations of the first group of perforations 202 can extend the length of the bend region 116, or less than the length of the bend region 116. Further, in some implementations, different lines can extend different lengths.

The arrows in FIG. 2A through 2E indicate the bend direction 204 of the bend region 116. FIG. 3 illustrates a portion of the bend region 116 that indicates the bend direction 204 in accordance with one or more embodiments described herein. Repetitive description of like elements employed in other embodiments described herein is omitted for sake of brevity. As illustrated in FIG. 3, the bend region can comprise an area of the support layer 108 from a first location 302 to a second location 304. The first location 302 is on a first side of the curve and the second location 304 is on a second side of the curve. The first location 302 and the second location 304 are perpendicular to a width of the bend region 116 along the bend direction. Accordingly, a first edge 206 of the perforations can be the line at, or near, the first location 302 and a second line edge 208 of the perforations can be located at, or near, the second location 304, or vice versa.

Figure 2B:
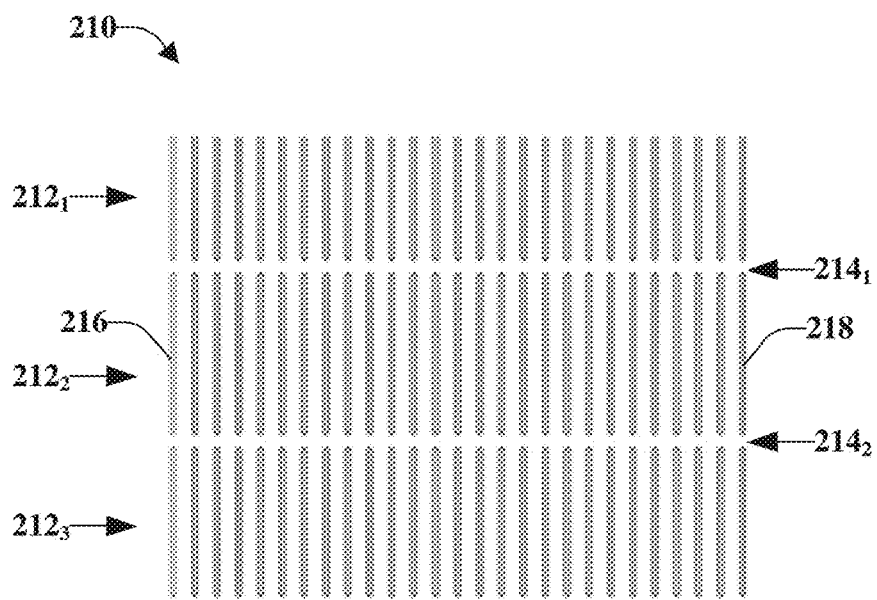

FIG. 2B illustrates a second group of perforations 210 that can comprise multiple vertical (as depicted in FIG. 2B) perforations that are parallel to one another. As illustrated the perforations can be divided into segments $212_1$, $212_2$, and $212_3$ with spaces $214_1$ and $214_2$ between the segments $212_1$, $212_2$, and $212_3$. Thus, the perforations can be discontinuous parallel perforations along the bend region of the support layer. It is noted that although three segments of perforations and two spaces are illustrated, the disclosed aspects are not limited to this implementation and another number of segments and spacing can be utilized.

The lines of the second group of perforations 210 can be a same length, similar lengths, or different lengths. Further, a first group of line segments 216 of the second group of perforations 210 can be located at, or near, the first location 302 and a second group of line segments 218 of the second group of perforations 210 can be located at, or near, the second location 304, or vice versa.

Figure 2C:
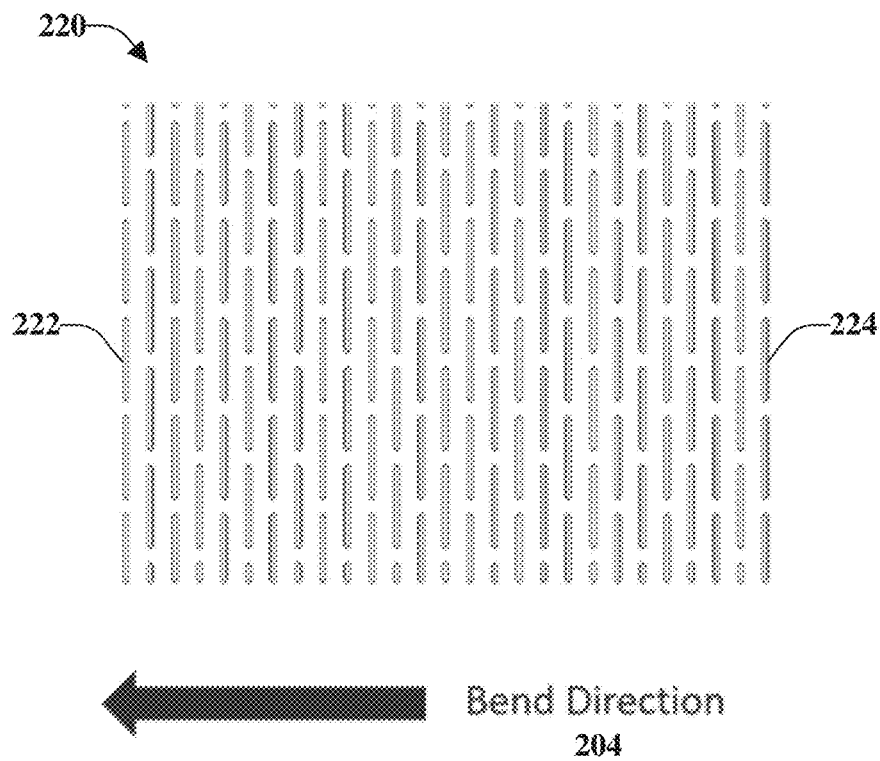

FIG. 2C illustrates a third group of perforations 220 that can comprise multiple vertical (as depicted in FIG. 2C) lines of perforations that are parallel to one another. Further, the lines of perforations can be offset as compared to adjacent lines of perforations. The multiple vertical perforations can extend a length of the bend region 116. However, according to some implementations, the multiple vertical perforations can extend less than a length of the bend region 116. Further, in some implementations, different lines can extend different lengths. As illustrated the lines of perforations can comprise broken perforations (e.g., are discontinuous parallel perforations).

A first line of broken perforations 222 of the third group of perforations 220 can be located at, or near, the first location 302 and a second line of broken perforations 224 of the third group of perforations 220 can be located at, or near, the second location 304, or vice versa.

Figure 2D:
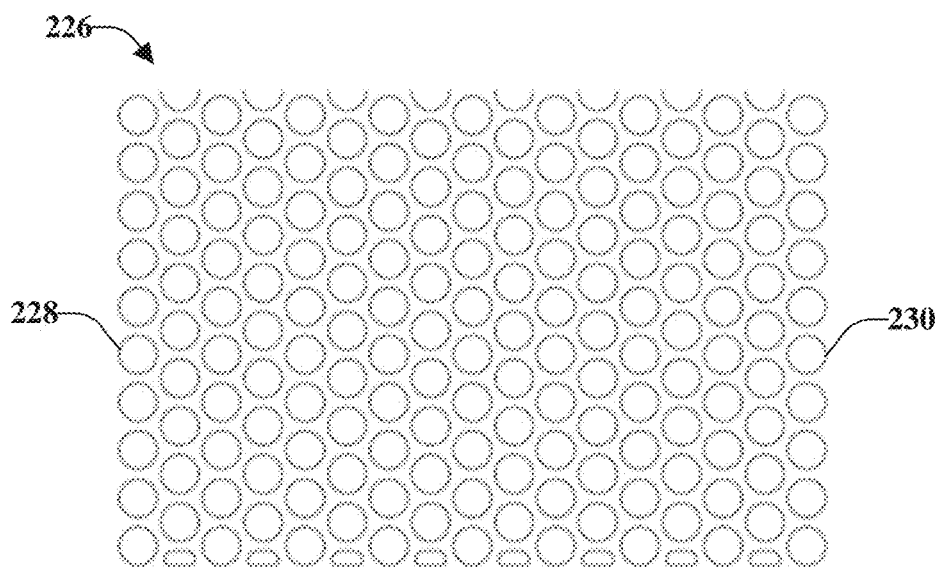

FIG. 2D illustrates a fourth group of perforations 226 that can comprise generally circular perforations (e.g., holes or openings) formed in the bend region 116 of the support layer 108. For example, the holes or openings can be cut out of the support layer 108. As illustrated, the fourth group of perforations 226 can be generally circular in shape, however, other shapes are possible including, for example, circular, oval, and so on. Although illustrated as generally formed in lines, the disclosed aspects are not limited to this implementation. Instead, the perforations can be staggered, uneven, and so on.

Further, although illustrated as having a same shape and size, the disclosed aspects are not limited to this implementation. Instead, the perforations can be different sizes and/or shapes. In some cases, a first group of perforations can be a first size and/or shape, a second group of perforations can be a second size and/or shape. Further, in some implementations, more than two groups of perforations can be included in the bend region 116. Thus, each group of the three or more groups can comprise different sizes and/or shapes. It is noted that perforations in each group do not have to be adjacent perforations. Instead, perforations of the first group can be dispersed throughout the bend region 116 along with the second group of perforations (as well as subsequent groups of perforations). Accordingly, perforations of each group of perforations do not have to be contiguous perforations.

A first line of perforations 228 of the fourth group of perforations 226 can be located at, or near, the first location 302 and a second line of perforations 230 of the fourth group of perforations 226 can be located at, or near, the second location 304, or vice versa.

Figure 2E:
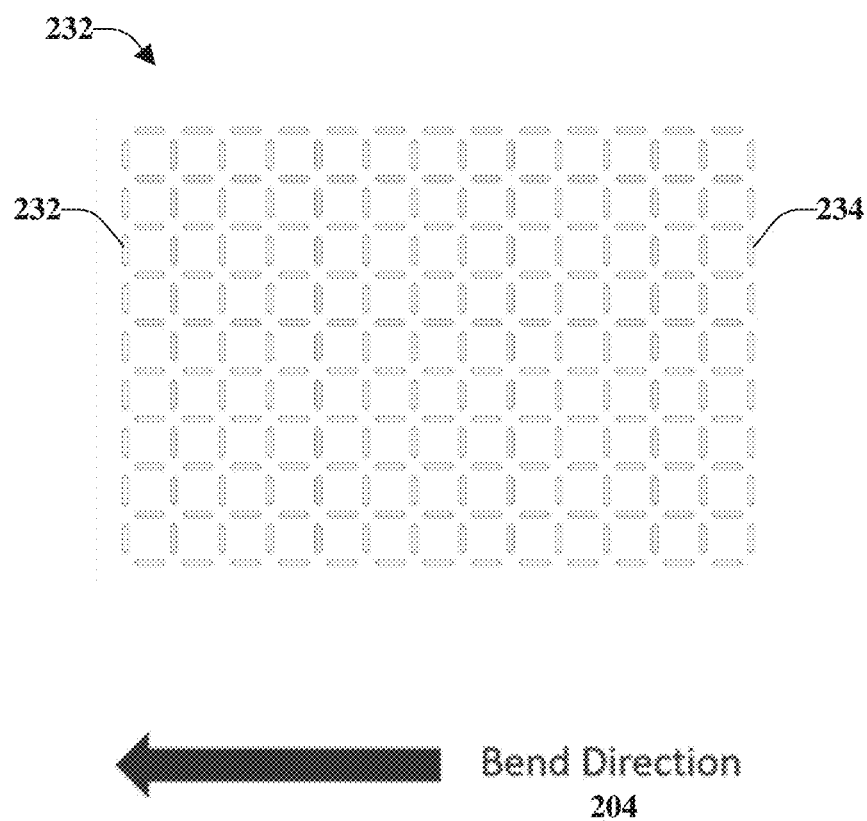

FIG. 2E illustrates a fifth group of perforations 232 that can comprise perforations (e.g., holes or openings) that form generally polygon or quadrilateral shapes in the bend region 116 of the support layer 108. For example, the holes or openings can be cut out of the support layer 108. As illustrated, the fifth group of perforations 232 can form generally quadrilateral shapes (e.g., square, rectangle, rhombus, parallelogram, trapezoid, and so on). Other shapes are also possible including, for example, triangular, diamond, and so on.

Further, although illustrated as forming the same shape and/or size, the perforations can form the same, substantially the same, or different shapes and/or sizes. In some cases, a first group of perforations can form a first size and/or shape, a second group of perforations can form a second size and/or shape. Further, in some implementations, more than two groups of perforations can be included. Thus, each group of the three or more groups can form different sizes and/or shapes. It is noted that shapes formed by each group of perforations do not have to be adjacent shapes. Instead, perforations formed as the first group can be dispersed throughout the bend region 116 along with the second group of perforations (as well as subsequent groups of perforations). Accordingly, shapes formed as perforations of each group of perforations do not have to be contiguous formed shapes.

A first line of perforations 232 of the fifth group of perforations 230 can be located at, or near, the first location 302 and a second line of perforations 234 of the fifth group of perforations 230 can be located at, or near, the second location 304, or vice versa.

It is noted that although FIGS. 2A through 2E illustrate specific perforations, the disclosed aspects are not limited to these implementations. Instead, other types of perforations, other sizes, and so on can be utilized with the disclosed aspects. According to some implementations, combinations of different types and/or sizes of perforations can be utilized. Further, the length of the perforations across the bend portion, the offset of the perforations (if any offset), the distance between perforations, the depth of the perforations, the thickness of the support layer, and/or other parameters, are a matter of design choice depending on the desired flexibility and desired supportiveness of the support layer after the addition of the perforations.

With continuing reference to FIG. 1, according to some implementations, the sensitivity can be increase by orders of magnitude as compared to a support layer that does not comprise perforations (e.g., a rigid support layer). Accordingly, the perforations can increase performance of the device, as well as reliability of the device with respect to forces being applied to the device.

Further, a flexible display panel 118 can be operatively attached or bonded to a second side 120 of the support layer 108. Thus, the support layer 108 can be sandwiched between the device chassis 102 and the flexible display panel 118. For example, the flexible display panel 118 can comprise a layer of adhesive film that can be laminated to the support layer 108. It is noted that adhesive layers are omitted from FIG. 1 for purposes of simplicity.

For example, the flexible display panel 118 can be a flat layer that can be formed (e.g., a curved portion 122 created on the flexible display panel 118) to the support layer 108 at about the same time as bonding occurs. In some implementations, the support layer 108 can be partially formed (e.g., the curved portion 122 can be pre-formed). In such a manner, the flexible display panel 118 bends around the curved portion 106.

The force sensor 104 of the device 100 is underneath the support layer 108. Forces applied to the edge of the device 100 should be capable of being transferred through the flexible display panel 118 and the support layer 108 in order to reach the force sensor 104. The support layer 108, without perforations as discussed herein, can be rigid and, due to such rigidity, force is not easily transferred through the support layer 108.

Figure 4:
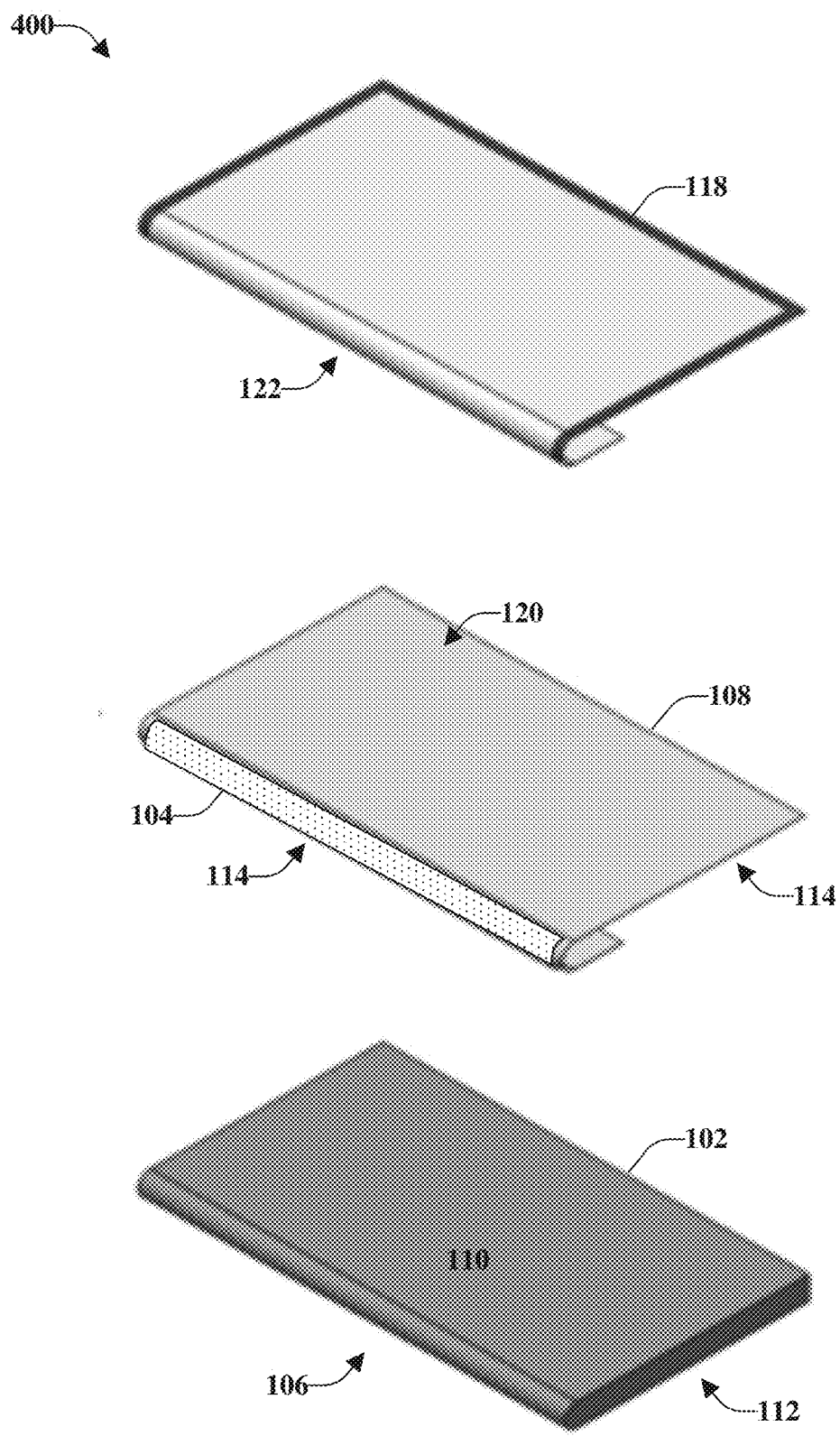
FIG. 4 illustrates another example, non-limiting, representation of various layers of a device that comprises a perforated support layer in accordance with one or more embodiments described herein.

FIG. 4 illustrates another example, non-limiting, representation of various layers of a device 400 that comprises a perforated support layer in accordance with one or more embodiments described herein. Repetitive description of like elements employed in other embodiments described herein is omitted for sake of brevity.

The device 400 is similar to the device 100 of FIG. 1. However, the force sensor 104 of the device is operatively attached to the support layer 108. For example, the force sensor 104 can be implemented on the outside of the curved section (e.g., the bend region 116) of the support layer 108. The force sensor 104, thus, can reside between the support layer 108 and the flexible display panel 118. Force applied to the flexible display panel 118 will be transmitted to the force sensor without having to pass through the support layer 108. It is noted that adhesive layers are omitted from FIG. 4 for purposes of simplicity. The perforations as discussed with respect to FIGS. 1-3 can be utilized for the bend region 116 of the support layer 108 of the device 400 to facilitate bending of the support layer 108 around curved surfaces (e.g., the bend region 116).

Figure 5:
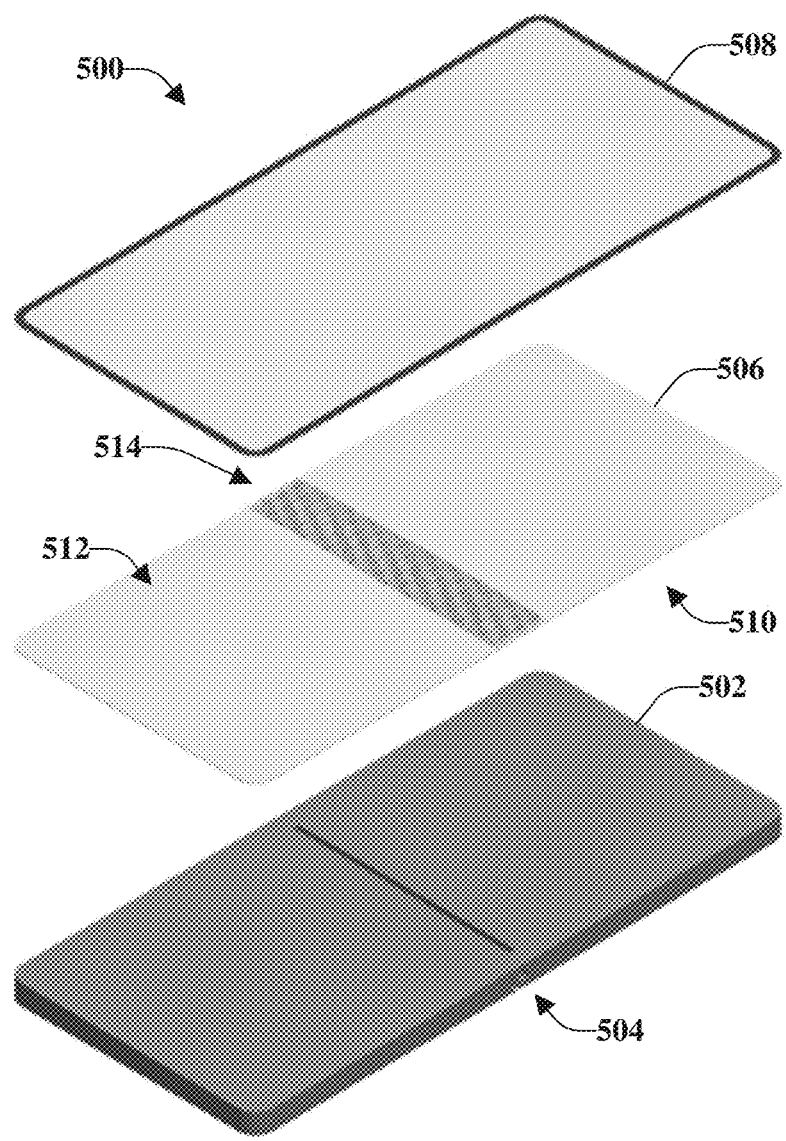
FIG. 5 illustrates an example, non-limiting, representation of layers of a foldable device that uses dynamic bending in accordance with one or more embodiments described herein.

FIG. 5 illustrates an example, non-limiting, representation of layers of a foldable device 500 that uses dynamic bending in accordance with one or more embodiments described herein. Repetitive description of like elements employed in other embodiments described herein is omitted for sake of brevity.

The foldable device 500 can comprise a device chassis 502 that can be folded at a designated location 504. It is noted that although the designated location 504 is illustrated at a middle of the foldable device 500, the disclosed aspects are not limited to this implementation. Instead, the designated fold location can be located at another location and/or there can be more than one designated fold location (e.g., a trifold device).

A support layer 506 can be operatively connected or operatively bonded to the device chassis 502 and a flexible display panel 508 can be operatively connected or bonded to the support layer 506. A first side 510 (e.g., the back as depicted in FIG. 6) of the support layer 506 can be laminated to the device chassis. A second side 512 (e.g., the front as depicted in FIG. 6) of the of the support layer 506 can be laminated to the flexible display panel 508.

The support layer 506 can comprise a bend region 514 that can comprise one or more perforations. Thus, the support layer 506 can be perforated in the bend region 514 to reduce stiffness and improve bending performance. The bend region 514 can be similar to the bend region 116 of FIG. 1 and FIG. 4. Accordingly, the perforations discussed with respect to FIGS. 2A through 2E, and FIG. 3 can be utilized with the foldable device 500. However, it is noted that the perforation geometry can be different between perforations for a static implementation and perforations for a dynamic implementation. The perforation geometry refers to the distance between perforations, the geometric shape, the length of the perforations, the width of the perforations, whether the perforations are staggered from one another, and other parameters.

Figure 6:
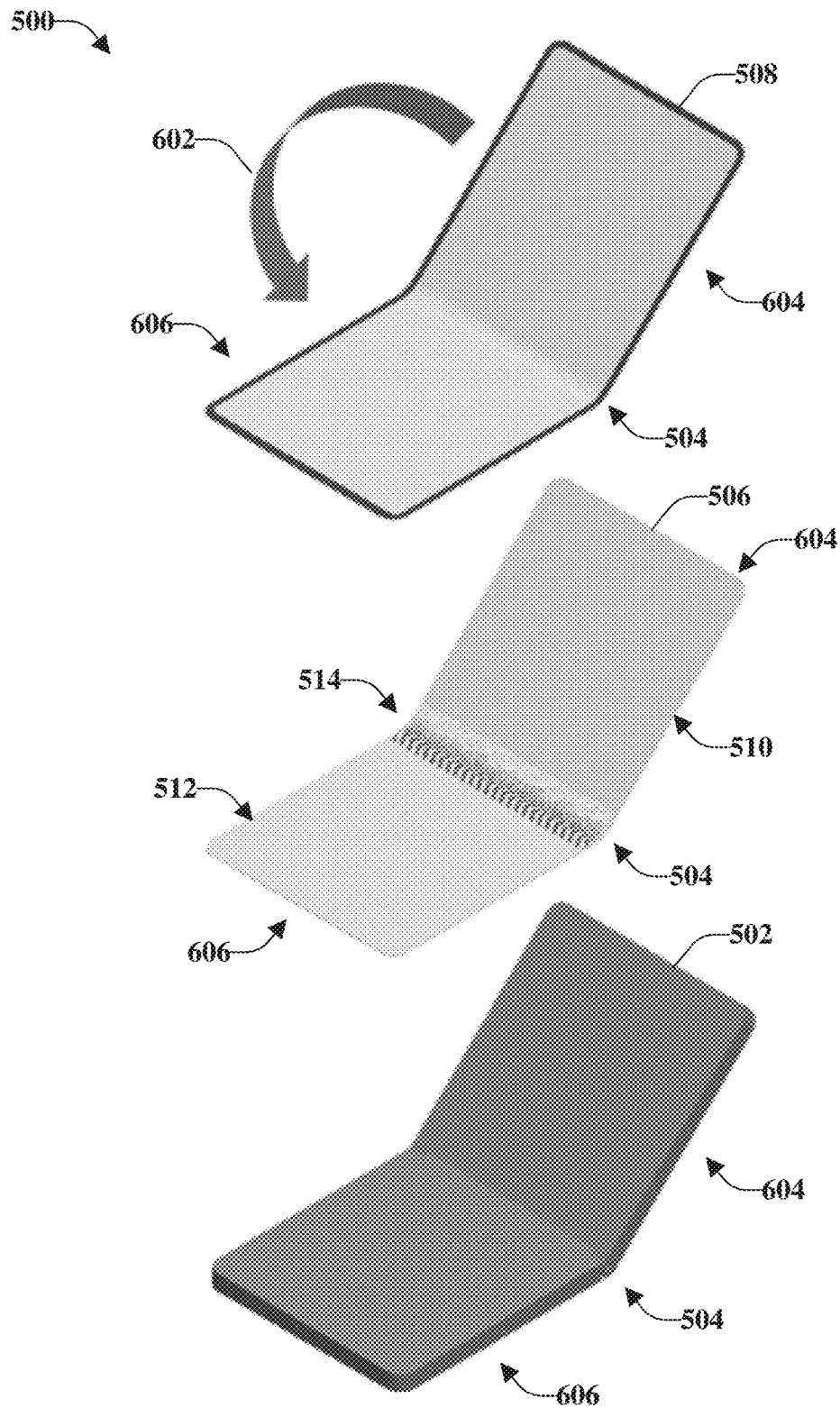
FIG. 6 illustrates the foldable device of FIG. 5 in a partially bent position in accordance with one or more embodiments described herein.

FIG. 6 illustrates the foldable device 500 of FIG. 5 in a partially bent position in accordance with one or more embodiments described herein. Repetitive description of like elements employed in other embodiments described herein is omitted for sake of brevity.

As illustrated, the layers (e.g., the device chassis 502, the support layer 506, and the flexible display panel 508) can be folded in a fold direction 602 and unfolded in a direction opposite the fold direction 602. Accordingly, the foldable device can be folded and unfolded any number of times. The perforations provided in the bend region 514 can reduce stiffness in the bending region while allowing the support layer 506 to support the flexible display panel 508.

The foldable device 500 is illustrated in FIG. 6 in a partially folded position. The foldable device 500 can also be folded in half where a top portion 604 of the foldable device 500 is placed into contact with a bottom portion 606 of the foldable device 500. Further, the foldable device 500 can be folded to an open position, such as the position illustrated in FIG. 5. According to some implementations, the foldable device 500 can be folded to between the fully open position (FIG. 5) to a fully closed position (where the top portion 604 contacts the bottom portion 606 or the foldable device 500 is completely folded in the fold direction 602), and/or any position therebetween.

Methods that can be implemented in accordance with the disclosed subject matter will be better appreciated with reference to various flow charts. While, for purposes of simplicity of explanation, the methods are shown and described as a series of blocks, it is to be understood and appreciated that the disclosed aspects are not limited by the number or order of blocks, as some blocks can occur in different orders and/or at substantially the same time with other blocks from what is depicted and described herein. Moreover, not all illustrated blocks can be required to implement the disclosed methods. It is to be appreciated that the functionality associated with the blocks can be implemented by software, hardware, a combination thereof, or any other suitable means (e.g., device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

Figure 7:
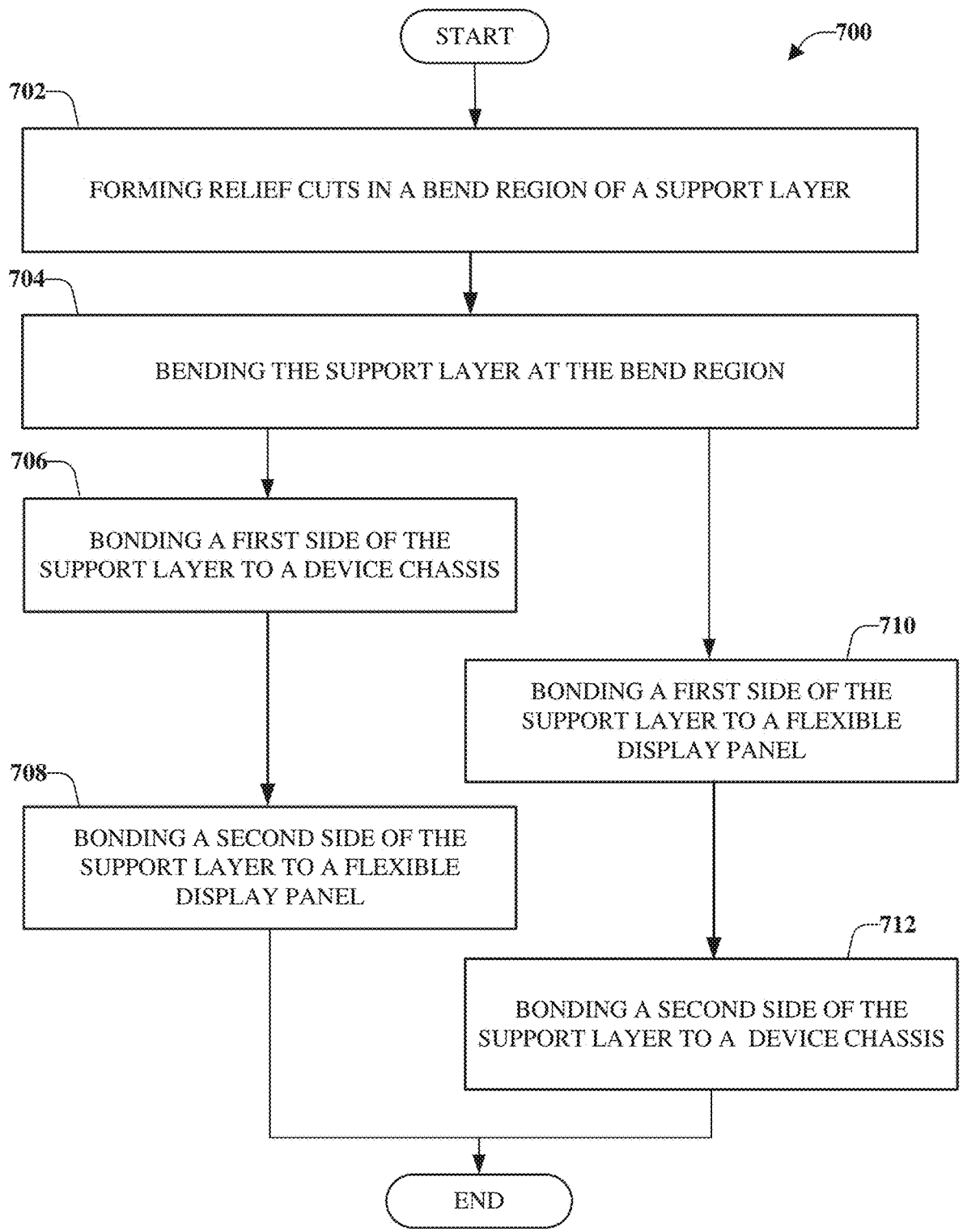
FIG. 7 illustrates a flow diagram of an example, non-limiting, method for fabricating a device comprising a perforated support layer in accordance with one or more embodiments described herein.

FIG. 7 illustrates a flow diagram of an example, non-limiting, method 700 for fabricating a device comprising a perforated support layer in accordance with one or more embodiments described herein. Repetitive description of like elements employed in other embodiments described herein is omitted for sake of brevity.

The method 700 starts, at 702, by forming relief cuts in a bend region (e.g., the bend region 116, the bend region 514) of a support layer (e.g., the support layer 108, the support layer 506). The relief cuts can be a group of perforations such as, for example, the first group of perforations 202, the second group of perforations 210, the third group of perforations 220, the fourth group of perforations 226, the fifth group of perforations 232, or another group of perforations.

The relief cuts can be made using various manufacturing processes. Examples of manufacturing processes can include, but are not limited to, chemical etching, laser cutting, die cutting, water jet, machining (Computer Numerical Control (CNC)), plasma cutting, Electrical Discharge Machining (EDM), injection molding, compression molding, and so on. Alternatively, or additionally, a combination of these processes could be used to cut an outline and create the relief pattern.

At 704, the support layer can be bent at the bend region. For example, the support layer can be bent around a device chassis (e.g., the device chassis 102, the device chassis 502). Bending the support layer at the bend region can be performed using various standard forming methods (e.g., press brake) and/or using specialized equipment. Alternatively, or additionally, bending the support layer at the bend region can be performed by hand (e.g., no machinery is needed) due to the low forces required to form the thin support with relief cuts. Further, the display panel is thin and can bend with the support layer. In an example, the display panel can be a flexible organic light-emitting diode (OLED) panel or another type of display panel. By way of example and not limiting, a flexible OLED panel can be around 0.11 mm to around 1.0 mm thick using standard manufacturing methods and/or materials.

According to some implementations, forming the relief cuts can comprise forming the relief cuts to extend from a first side (e.g., the first side 114, the first side 510) to a second side (e.g., the second side 120, the second side 512) of the support layer. For example, the relief cuts can extend through the support layer (e.g., from a first side of the support layer to a second side of the support layer). In another example, forming the relief cuts can comprise forming the relief cuts partially through the support layer from the first side, wherein the second side comprises a smooth surface at the bend region. Alternatively, forming the relief cuts can comprise forming the relief cuts partially through the support layer from the second side, wherein the first side comprises a smooth surface at the bend region. Forming the relief cuts can comprise creating a static bend region. Alternatively, forming the relief cuts can comprise creating a dynamic bend region.

In accordance with an implementation, forming the relief cuts can comprise orienting the relief cuts perpendicular to the bend region. In an example, forming the relief cuts can comprise forming parallel perforations along the bend region of the support layer. In another example, forming the relief cuts can comprise forming discontinuous parallel perforations along the bend region of the support layer. According to another example, forming the relief cuts can comprise forming generally circular perforations. In another example, forming the relief cuts can comprise forming relief cuts or perforations that form generally quadrilateral shapes in the bend region of the support layer.

The method 700 can continue, at 706, with bonding the first side of the support layer to a device chassis (e.g., the device chassis 102, the device chassis 502). The bonding can be performed by applying an adhesive layer to the first side of the support layer and/or to a corresponding side of the device chassis. The support layer and device chassis can be contacted (e.g., pressed) together for the adhesive to operatively connect or bond the support layer and the device chassis together.

Further, at 708, the second side of the support layer can be bonded to a flexible display panel (e.g., the flexible display panel 118, the flexible display panel 508). The bonding can be performed by applying another adhesive layer to the second side of the support layer and/or to a corresponding side of the flexible display panel. The support layer and flexible display panel can be contacted (e.g., pressed) together for the adhesive to operatively connect or bond the support layer and the flexible display panel together.

Alternatively, after bending the support layer at the bend region, the method 700 can continue, at 710, with bonding a first side (e.g., illustrated in FIG. 1 as the second side 120, illustrated in FIG. 5 as the second side 512) of the support layer to a flexible display panel. At 712, a second side (e.g., illustrated in FIG. 1 as the first side 114, illustrated in FIG. 5 as the first side 510) of the support layer can be bonded to a device chassis.

Figure 8:
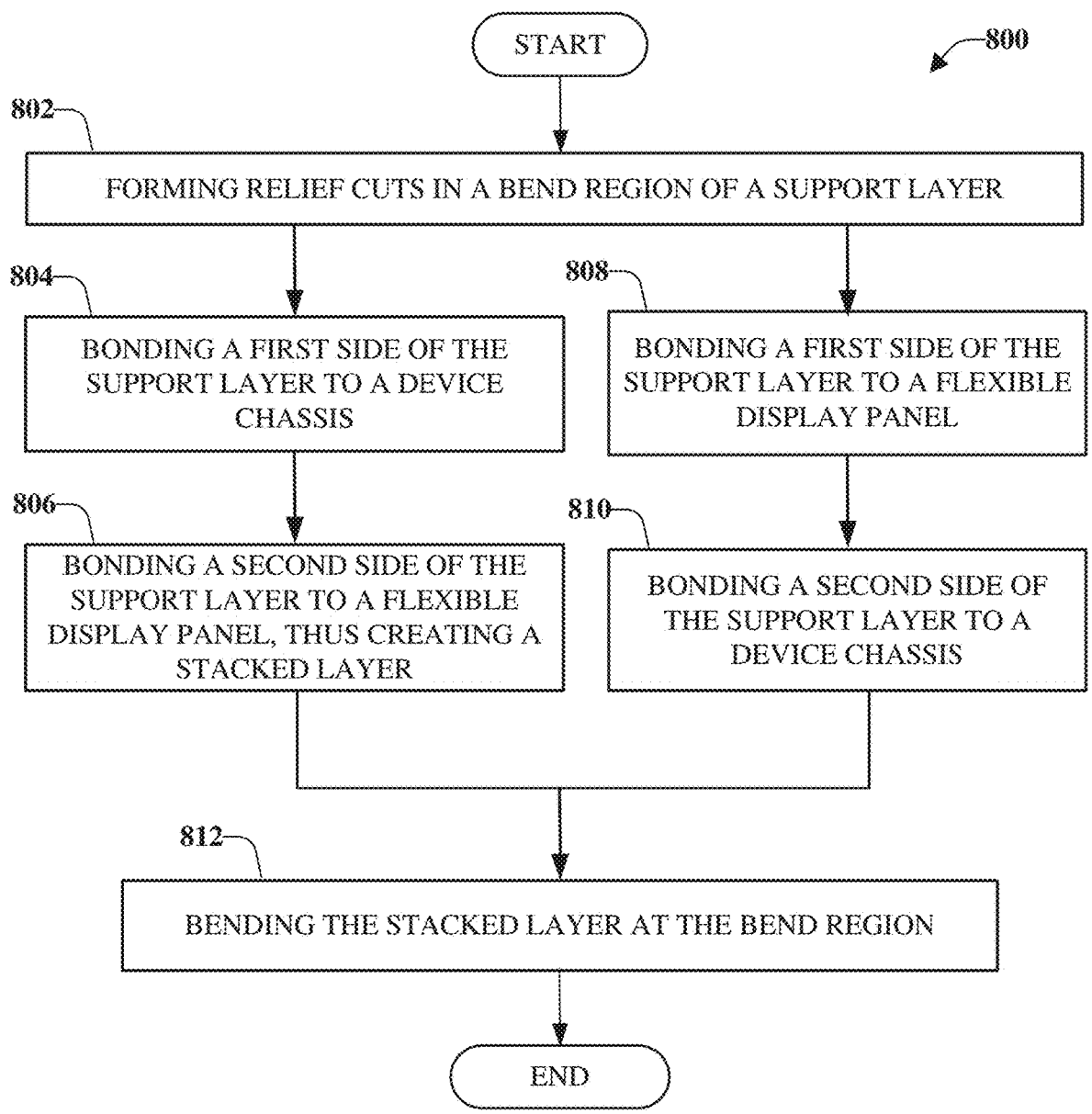
FIG. 8 illustrates a flow diagram of another example, non-limiting, method for fabricating a device comprising a perforated support layer in accordance with one or more embodiments described herein.

FIG. 8 illustrates a flow diagram of another example, non-limiting, method 800 for fabricating a device comprising a perforated support layer in accordance with one or more embodiments described herein. Repetitive description of like elements employed in other embodiments described herein is omitted for sake of brevity.

At 802, relief cuts can be created in a bend region of a support layer (e.g., the support layer 108, the support layer 506). The relief cuts can be a group of perforations such as, for example, the first group of perforations 202, the second group of perforations 210, the third group of perforations 220, the fourth group of perforations 226, the fifth group of perforations 232, or another group of perforations. The relief cuts can be created as discussed above with respect to FIG. 7.

At 804, a first side (e.g., the first side 114, the first side 510) of the support layer can be operatively bonded to a device chassis (e.g., the device chassis 102, the device chassis 502). The bonding can be performed by applying an adhesive layer to the first side of the support layer and/or to a corresponding side of the device chassis. The support layer and device chassis can be contacted (e.g., pressed) together for the adhesive to operatively connect or bond the support layer and the device chassis together.

A second side (e.g., the second side 120, the second side 512) of the support layer can be operatively bonded to a flexible display panel (e.g., the flexible display panel 118, the flexible display panel 508), at 806. The bonding can be performed by applying another adhesive layer to the second side of the support layer and/or to a corresponding side of the flexible display panel. The support layer and flexible display panel can be contacted (e.g., pressed) together for the adhesive to operatively connect or bond the support layer and the flexible display panel together. The bonding at 804 and 806 is performed while the layers are flat (e.g., prior to bending, bonded together in a flat format).

Alternatively, the support layer can be bonded to the flexible display panel prior to being bonded to the device chassis. Thus, after forming the relief cuts at 808, a first side (e.g., illustrated in FIG. 1 as the second side 120, illustrated in FIG. 5 as the second side 512) the of the support layer can be bonded to a flexible device. Further, at 810, a second side (e.g., illustrated in FIG. 1 as the first side 114, illustrated in FIG. 5 as the first side 510) of the support layer can be bonded to the device chassis.

After the layers are operatively bonded (e.g., stacked as indicated at 804 and 806, or at 808 and 810), at 812, the stack can be bent at the bend region. For example, the stack can be formed around the device chassis. Bending the stack at the bend region can be performed in substantially the same manner as discussed with respect to FIG. 7. By bending the stacked layers after the bonding, production of the devices can be quicker and easier to perform in an automated matter (e.g., less expensive to manufacture) as compared to FIG. 7 where the support layer is bent prior to the bonding.

As discussed herein, provided are modifications to support layers (e.g., thin support layers) that address the challenges faced when bending the support layers. More specifically, provided are modifications to support layers that address the challenges faced when bending flexible sensors and flexible display panels using a thin support layer. Examples of these benefits are described below.

In the application described with respect to FIG. 1, patterned relief cuts can be used to improve the bendability of the support layer and/or to improve force sensor capabilities and performance beneath the support layer (see FIGS. 2A through 2E, and FIG. 3). Forces applied to the curved edge of the display can be transferred through the perforated support layer more easily (as compared to traditional thin support layers without perforations), thereby making the force sensor more sensitive to light touches.

Another advantage of adding relief cuts (or perforations) along the bend region of the support layer as discussed herein is its ability to reduce rigidity of the bend region. FIG. 5 and FIG. 6 describe a dynamic bending application where the stiffness of the overall stack-up dictates the life of the device by defining the number of times the device can fold before experiencing a failure. In this case, reducing the stiffness of the bend region (e.g., using relief cuts or perforations as discussed herein) can extend the life of the product while maintaining structural support and cosmetic requirements.

According to an embodiment, provided herein is a device comprising a device chassis, a flexible display panel, and a support layer sandwiched between the device chassis and the flexible display panel. The support layer can comprise a set of perforations formed in a bend region of the support layer.

In an example, the set of perforations can penetrate from a first side of the support layer to a second side of the support layer. In another example, the set of perforations can extend from a first side of the support layer to a depth that does not penetrate a second side of the support layer, or vice versa. An orientation of the set of perforations can be perpendicular to the bend region.

According to some implementations, the set of perforations can comprise parallel perforations along the bend region of the support layer. In some implementations, the set of perforations can comprise discontinuous parallel perforations along the bend region of the support layer. The set of perforations, according to some implementations, can comprise generally circular perforations. In an additional or alternative example, the set of perforations can comprise perforations that form generally quadrilateral shapes in the bend region of the support layer.

The bend region can be a static bend region. Alternatively, the bend region can be a dynamic bend region. The device can be a foldable device (e.g., capable of being opened and closed at a fold region). In an example, the device chassis can comprise a force sensor. In another example, the support layer can comprise a force sensor.

According to some implementations, the support layer can comprise a first side and a second side opposite the first side. The device chassis can be bonded to the first side of the support layer. The flexible display panel can be bonded to the second side of the support layer.

Another embodiment provided herein is a method of fabricating a device. The method can comprise forming relief cuts in a bend region of a support layer. The method also can comprise bonding a first side of the support layer to a device chassis and bonding a second side of the support layer to a flexible display panel.

In an example, prior to bonding the first side of the support layer to the device chassis, the method can comprise bending the support layer at the bend region. In another example, bonding the first side and bonding the second side can create a stacked layer. Further to this example, the method can comprise bending the stacked layer at the bend region.

Forming the relief cuts can comprise, according to an example, forming the relief cuts partially through the support layer from the second side. In this example, the first side can comprise a smooth surface at the bend region. In another example, forming the relief cuts can comprise forming the relief cuts partially through the support layer from the first side. In this example, the second side can comprise a smooth surface at the bend region.

In some implementations, forming the relief cuts can comprise creating a static bend region. In an alternative implementation, forming the relief cuts can comprise creating a dynamic bend region.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," "in an embodiment," "an implementation" in various places throughout this specification are not necessarily all referring to the same embodiment. Furthermore, the particular features, structures, or characteristics can be combined in any suitable manner in one or more embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A device, comprising:
a device chassis,
a force sensor operatively bonded to the device chassis, wherein the force sensor is located at a curved portion of the device;
a flexible display panel; and
a support layer sandwiched between the device chassis and the flexible display panel, the support layer comprising a set of perforations formed in a bend region of the support layer, wherein a location of the bend region corresponds to the curved portion of the device.

2. The device of claim 1, wherein the set of perforations penetrate from a first side of the support layer to a second side of the support layer.

3. The device of claim 1, wherein the set of perforations extend from a first side of the support layer to a depth that does not penetrate a second side of the support layer.

4. The device of claim 1, wherein an orientation of the set of perforations is perpendicular to the bend region.

5. The device of claim 1, wherein the set of perforations comprise parallel perforations along the bend region of the support layer.

6. The device of claim 1, wherein the set of perforations comprise discontinuous parallel perforations along the bend region of the support layer.

7. The device of claim 1, wherein the set of perforations comprise generally circular perforations.

8. The device of claim 1, wherein the set of perforations comprise perforations that form generally quadrilateral shapes in the bend region of the support layer.

9. The device of claim 1, wherein the bend region is a static bend region.

10. The device of claim 1, wherein the bend region is a dynamic bend region.

11. The device of claim 1 is a foldable device.

12. The device of claim 1, wherein the support layer comprises a first side and a second side opposite the first side, wherein the device chassis is bonded to the first side of the support layer, and wherein the flexible display panel is bonded to the second side of the support layer.

13. A method of fabricating a device, comprising:
forming relief cuts in a bend region of a support layer;
bonding a force sensor to a device chassis;
bonding a first side of the support layer to the device chassis, wherein a location of the force sensor corresponds to the bend region of the support layer; and
bonding a second side of the support layer to a flexible display panel.

14. The method of claim 13, further comprising:
prior to the bonding the first side of the support layer to the device chassis, bending the support layer at the bend region.

15. The method of claim 13, wherein the bonding the first side and the bonding the second side creates a stacked layer, and wherein the method further comprises:
bending the stacked layer at the bend region.

16. The method of claim 13, wherein the forming relief cuts comprises forming relief cuts partially through the support layer from the second side, wherein the first side comprises a smooth surface at the bend region.

17. The method of claim 13, wherein the forming relief cuts comprises creating a static bend region.

18. The method of claim 13, wherein the forming relief cuts comprises creating a dynamic bend region.

* * * * *